L. M. Hart,
Making Pottery.

Nº 64,313.  Patented Apr. 30, 1867.

Witnesses:
Walter Hughman
C. F. St John

Inventor:
Llewellyn M. Hart
By his Atty J Dennis jr

United States Patent Office.

LLEWELLYN M. HART, OF PHILADELPHIA, PENNSYLVANIA, ASSIGNOR TO HIMSELF AND CHARLES S. HINCHMAN, OF THE SAME PLACE.

Letters Patent No. 64,313, dated April 30, 1867.

IMPROVED MACHINE FOR PRESSING TUYERES.

*The Schedule referred to in these Letters Patent and making part of the same.*

TO ALL WHOM IT MAY CONCERN:

Be it known that I, LLEWELLYN M. HART, of the city of Philadelphia, Philadelphia county, State of Pennsylvania, have invented certain new and useful improvements in Machines for Pressing Tuyeres, or other articles of clay or other plastic composition; and I do hereby declare the following description and accompanying drawings are sufficient to enable any person skilled in the art or science to which it most nearly appertains to make and use my said invention or improvements without further invention or experiment.

The nature of my invention and improvements consists in a traversing core mould in connection with a traversing carriage carrying two or more moulds. In the accompanying drawings—

Figure 1:
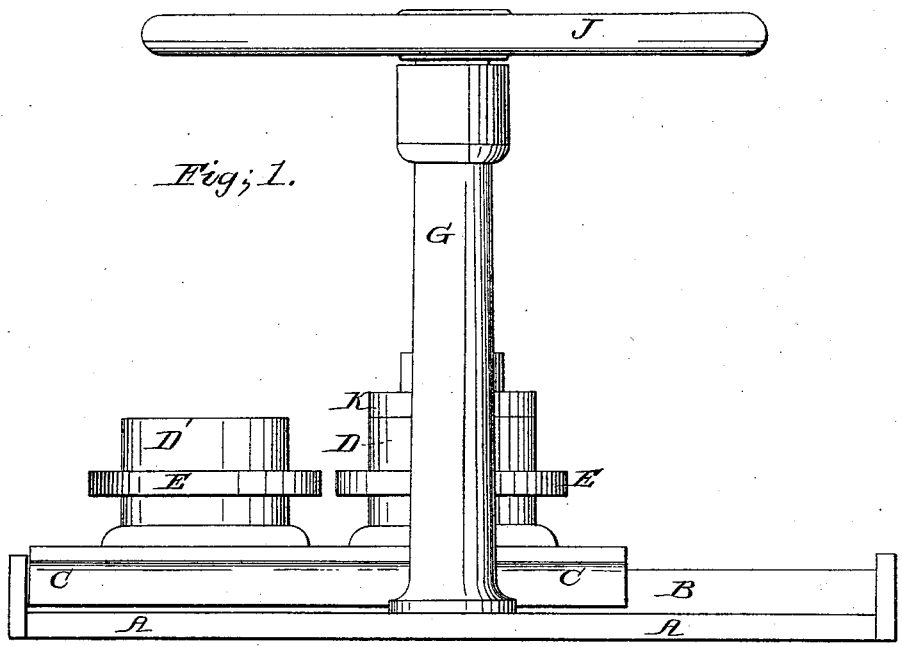
Figure 1 is an elevation of one side.
Figure 2:
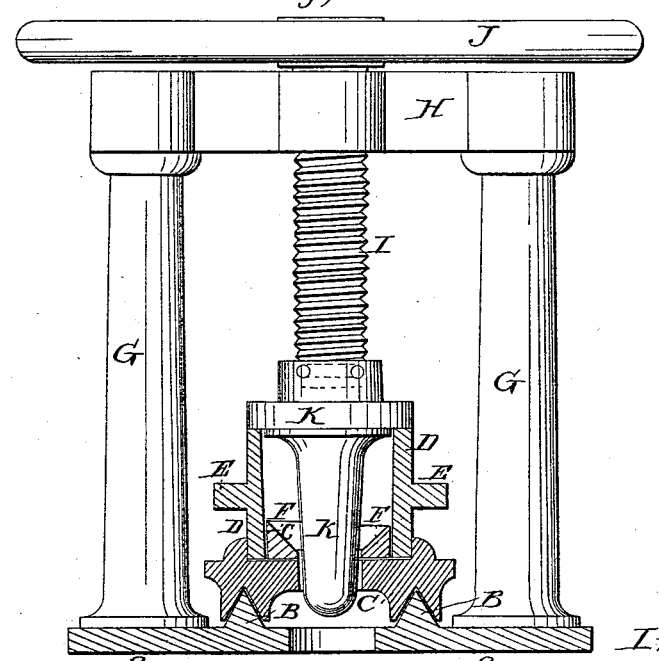
Figure 2 is an elevation of one end, with the mould, carriage, and bed-plate shown in section.

In these drawings, A is a bed-plate, made of cast iron, or other material, in the form shown, or such other form as will answer the purpose, and provided with two ways B B on its upper surface for the carriage C to traverse on, which carriage may be made in the form shown in the drawings, and fitted to run on the ways B B, and also provided with two circular flanges on its upper surface to govern the position of the moulds D and D'. The carriage is also perforated in the centre of the flanges for the point of the traversing core mould to pass through it. The moulds D and D' are made largest at the top on the inside to facilitate the removal of the article moulded, and provided with a flange, E, on the outside for the convenience of handling them. A ring, F, shown in section in fig. 2, is fitted to the bottom of the mould, which ring prevents the article moulded from sticking to the carriage, and facilitates the discharge of the article or tuyere moulded from the mould. The columns G G are firmly fastened in the bed-plate A, and support the bar H, which is firmly fastened to their upper ends in some convenient manner. The bar H is perforated, and provided with a female screw, to which the screw I is fitted, which screw I is provided with a hand-wheel, J, to turn it, and work the traversing core mould K, fitted to its lower end, so that the screw will turn freely in it, or otherwise. There are some stops, L L, at the ends of the ways B B, which stop the carriage when the mould on the carriage is under the core mould, when the carriage is moved either way.

To operate the machine and make tuyeres I first oil the inside of the moulds and the top of the rings F, so that the tuyeres formed in the moulds will shed or slip out easily, and also oil the traversing core mould, and put a sufficient quantity of clay or composition, properly tempered, into the mould D, to form a tuyere. Then move the carriage against the stops on the opposite end of the ways from the mould filled, which brings the mould, with the clay, under the traversing core mould, when the screw is turned, and the core forced down through the clay until the collar on the core mould comes to the top of the mould D on the carriage, when the screw may be turned in the opposite direction, and the core withdrawn. Then the mould D' should be filled with clay, and the carriage run to the opposite end of the ways, which brings the mould D' under the core mould, and carries the mould D out. The screw should now be turned so as to force the core down through the mould D', and from the tuyere, when the mould D should be removed and reversed on a table, and taken off of the tuyere with the ring, and put back on the carriage, and refilled with clay. The core which was left standing in the tuyere may be withdrawn, and the carriage run to the opposite end of the ways, bringing the mould D again under the core mould ready to repeat the operation.

I claim, in combination with a traversing core mould, a traversing carriage, carrying two or more moulds for making tuyeres or other articles of clay or other plastic substances.

L. M. HART.

Witnesses:
PETER STUCKER,
E. ROBERTS COX.